US006900945B2

(12) United States Patent
Mori et al.

(10) Patent No.: US 6,900,945 B2
(45) Date of Patent: May 31, 2005

(54) LENTICULAR LENS SHEET

(75) Inventors: Yuko Mori, Tokyo-To (JP); Katsunori Shintani, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 10/804,204

(22) Filed: Mar. 19, 2004

(65) Prior Publication Data

US 2004/0233541 A1 Nov. 25, 2004

(30) Foreign Application Priority Data

Mar. 20, 2003 (JP) ....................................... 2003-077811

(51) Int. Cl.$^7$ ........................ G02B 27/10; G03B 21/60; H04N 5/72; H04N 5/74
(52) U.S. Cl. ....................... 359/619; 359/456; 359/457; 348/786; 348/779
(58) Field of Search .............................. 359/619, 456, 359/457, 460, 621, 622; 348/786, 779

(56) References Cited

U.S. PATENT DOCUMENTS

| | | | | |
|---|---|---|---|---|
| 4,432,010 A | * | 2/1984 | Oguino | 348/786 |
| 4,536,056 A | * | 8/1985 | Oguino | 359/457 |
| 5,400,114 A | * | 3/1995 | Yoshida et al. | 359/457 |
| 5,513,037 A | * | 4/1996 | Yoshida et al. | 359/457 |
| 5,889,613 A | * | 3/1999 | Watanabe | 359/456 |

FOREIGN PATENT DOCUMENTS

| | | |
|---|---|---|
| JP | 58-59436 | 4/1983 |
| JP | 62-280729 | 12/1987 |
| JP | 2-190835 | 7/1990 |
| JP | 5-150371 | 6/1993 |

* cited by examiner

*Primary Examiner*—Loha Ben
(74) *Attorney, Agent, or Firm*—Parkhurst & Wendel, L.L.P.

(57) ABSTRACT

A lenticular lens sheet 4 comprises a plurality of lens elements of incidence 21 arranged on the incidence side, and a plurality of lens elements of emergence 22 arranged on the emergence side. The light that has passed through each lens element of incidence 21 converges via the protruding apex of the corresponding lens element of emergence 22. The lens plane of the center portion C of each lens element of emergence 22, the width of this portion C being a half of the total lens width L (i.e., L/2), is in the shape defined by a curved line fulfilling the conditions expressed by the following numerical formulae (1) to (4), and the lens plane of each side portion S of each lens element of emergence 22, the width of this portion S being a quarter of the total lens width L (i.e., L/4), is in the shape defined by a curved line fulfilling the conditions expressed by the following numerical formulae (5) to (8): $y = a \times b^{-x} - e$ $(-L/4 \leq x \leq 0)$ ... (1), $y = a \times b^{x} - e$ $(0 \leq x \leq L/4)$ ... (2), $3.0 \times 10^{-4} < a < 3.8 \times 10^{-4}$ ... (3), $1.0 \times 10^{24} < b < 1.0 \times 10^{25}$ ... (4), $y = c \times d^{-x} - e$ $(-L/2 \leq x \leq -L/4)$ ... (5), $y = c \times d^{x} - e$ $(L/4 \leq x \leq L/2)$ ... (6), $3.0 \times 10^{-3} < c < 3.1 \times 10^{-3}$ ... (7), and $2.7 \times 10^{9} < d < 4.0 \times 10^{9}$ ... (8).

10 Claims, 4 Drawing Sheets

LENTICULAR LENS SHEET

BACKGROUND OF THE INVENTION

1. Field of the Invention

The present invention relates to a lenticular lens sheet for use in a rear projection screen that allows light emitted from an image source, incident on the rear of the screen, to emerge toward the viewer's side, and more particularly to a lenticular lens sheet capable of reducing the color shift.

2. Description of Related Art A method in which imaging light emitted from three CRT's (projection tubes) for R, G and B, serving as an image source, are magnified by projection lenses and are projected on a rear projection screen (hereinafter sometimes abbreviated to a "screen") is known as a method of displaying an image on a large-sized screen.

Specifically, for example, in such a rear projection display 10 as is shown in FIG. 1, imaging light emitted from three CRT's 1 for R, G and B, serving as an image source, are magnified by respective projection lenses 2 and are projected on the plane of a rear projection screen 5. The rear projection screen 5 comprises a Fresnel lens sheet 3 and a lenticular lens sheet 4 and allows the imaging light emitted from the CRT's 1, incident on the rear of the screen, to emerge toward the viewer's side at the desired angle of view.

For such a rear projection screen 5, the CRT's 1 for R, G and B are usually so arranged that the CRT 1 for green color (G) is positioned directly in front of the screen and that the CRT 1 for red color (R) and the CRT 1 for blue color (B) are positioned on either side of the CRT 1 for G. Therefore, of the imaging light incident on the front surface of the screen, red light (R) and blue light (B) are, relative to green light (G), to enter the screen at an angle of convergence $\theta$ with the normal to the screen. Owing to this angle of convergence $\theta$ at which red light (R) and blue light (B) converge on the screen, either R or B color appears stronger as the point from which the image projected on the rear projection screen 5 is viewed is changed horizontally, and the marginal parts of the screen get colored. This phenomenon is called "color shift," and it is hoped that the color shift will be reduced.

Studies have already been made on this phenomenon, and Japanese Laid-Open Patent Publication No. 59436/1983, for example, proposes a technique in which the eccentricities of the elliptical planes of lens elements to be formed on both surfaces of a lenticular lens sheet are selected so that they are nearly equal to the reciprocal of the refractive index of a material from which the lens elements are made. Further, Japanese Laid-Open Patent Publications No. 280729/1987, No. 190835/1990 and No. 150371/1993 propose techniques in which the shapes of lens elements to be formed on both surfaces of a lenticular lens sheet are numerically specified.

The above-described color shift is observed more clearly as the angle $\theta$ at which imaging light converges increases. In line with the recent trend toward thinner televisions, the angle of convergence $\theta$ tends to become greater than ever before. For this reason, it has been getting difficult to reduce the color shift by the color-shift-reducing techniques proposed so far in the above-described patent publications, etc., and the situation has been changing to that these conventional techniques cannot always satisfactorily fulfill the demand for color-shift reduction.

SUMMARY OF THE INVENTION

The inventors have made earnest studies under these circumstances, and, as a result, have found that the shape of lens elements of emergence to be arranged on the emergence side of a lenticular lens sheet is of great importance and that by controlling this shape, it is possible to decrease both the amount of outgoing blue light (B), which has so far appeared to be too large when the projected image is viewed from an angle between 20° and 40°, and the amount of outgoing red light (R), which has so far appeared to be too large when the projected image is viewed from an angle between −20° and −40°.

The present invention has been accomplished on the basis of the above findings. An object of the present invention is, therefore, to provide a lenticular lens sheet for use in a rear projection screen that allows imaging light emitted from an image source such as three-tube-type projection tubes, incident on the rear of the screen, to emerge toward the viewer's side, capable of effectively reducing the color shift.

The present invention provides, as a first aspect for fulfilling the object of the invention, a lenticular lens sheet for use in a rear projection screen that allows imaging light emitted from an image source, the imaging light being incident on the rear of the screen, to emerge toward the viewer's side, comprising: a plurality of lens elements of incidence arranged on the incidence side; and a plurality of lens elements of emergence arranged on the emergence side, wherein the light that has passed through each lens element of incidence converges via the protruding apex of the corresponding lens element of emergence; the lens plane of the center portion of each lens element of emergence, the width of the center portion being a half of the total lens width, is in the shape defined by a curved line fulfilling the conditions expressed by the following numerical formulae (1) to (4):

$$y = a \times b^{-x} - e \quad (-L/4 \leq x \leq 0) \tag{1},$$

$$y = a \times b^{x} - e \quad (0 \leq x \leq L/4) \tag{2},$$

$$3.0 \times 10^{-4} < a < 3.8 \times 10^{-4} \tag{3, and}$$

$$1.0 \times 10^{24} < b < 1.0 \times 10^{25} \tag{4};$$

the lens plane of each side portion of each lens element of emergence, the width of the each side portion being a quarter of the total lens width, is in the shape defined by a curved line fulfilling the conditions expressed by the following numerical formulae (5) to (8):

$$y = c \times d^{-x} - e \quad (-L/2 \leq x \leq -L/4) \tag{5},$$

$$y = c \times d^{x} - e \quad (L/4 \leq x \leq L/2) \tag{6},$$

$$3.0 \times 10^{-3} < c < 3.1 \times 10^{-3} \tag{7, and}$$

$$2.7 \times 10^{9} < d < 4.0 \times 10^{9} \tag{8; and}$$

the curved lines defining the shape of the lens plane of each lens element of emergence, given by the above numerical formulae (1) to (8), are on the x-y coordinates, and in these numerical formulae, $\underline{x}$ denotes the coordinate axis passing through both ends of the lens element of emergence, extending in the direction of the width of this lens element, $\underline{y}$ denotes the coordinate axis crossing the protruding apex of the lens element of emergence, the positive direction of the y-coordinate axis being from the viewer's side toward the image source side, L is the distance between the two ends of the lens element of emergence, $\underline{a}$, $\underline{b}$, $\underline{c}$ and $\underline{d}$ are the coefficients, and $\underline{e}$ is the intercept between the curved line and the y-coordinate axis and is the coefficient relating to the height of the lens element of emergence.

According to the first aspect for fulfilling the object of the present invention, in each lens element of emergence through which the light collected by each lens element of incidence passes, the shape of the lens plane of the center portion of the lens, the width of this portion being a half of the total lens width, is different from the shape of the lens plane of each side portion of the lens, the width of this portion being a quarter of the total lens width, and the shapes of the lens planes of these portions are defined by curved lines fulfilling the conditions expressed by the above numerical formulae (1) to (8), so that it is possible to effectively scatter the amount of the light (red light (R) and blue light (B)) that emerge from the lens elements of emergence after obliquely entering the lens planes of these lens elements. For this reason, it is possible to decrease both the amount of outgoing blue light (B), which has so far appeared to be too large when the projected image is viewed from an angle between 20° and 40°, and the amount of the outgoing red light (R), which has so far appeared to be too large when the projected image is viewed from an angle between −20° and −40°. As a result, the balance between those parts in which the amount of light is too large and those parts in which the amount of light is small is improved, and the color shift can thus be reduced.

The present invention provides, as a second aspect for fulfilling the object of the invention, a lenticular lens sheet for use in a rear projection screen that allows imaging light emitted from an image source, the imaging light being incident on the rear of the screen, to emerge toward the viewer's side, comprising a plurality of lens elements of incidence arranged on the incidence side; and a plurality of lens elements of emergence arranged on the emergence side, wherein the light that has passed through each lens element of incidence converges via the protruding apex of the corresponding lens element of emergence; the lens plane of the center portion of each lens element of emergence, the width of the center portion being a half of the total lens width, is in the shape defined by a curved line fulfilling the conditions expressed by the following numerical formulae (1) to (4):

$$y = a \times b^{-x} - e \ (-L/4 \leq x \leq 0) \tag{1},$$

$$y = a \times b^{x} - e \ (0 \leq x \leq L/4) \tag{2},$$

$$3.0 \times 10^{-4} < a < 3.8 \times 10^{-4} \tag{3), and}$$

$$1.0 \times 10^{24} < b < 1.0 \times 10^{25} \tag{4};$$

the lens plane of each side portion of each lens element of emergence, the width of the each side portion being a quarter of the total lens width, is in the shape defined by a curved line fulfilling the conditions expressed by the following numerical formulae (9) to (12):

$$y = c \times d^{-x} - e \ (-L/2 \leq x \leq -L/4) \tag{9},$$

$$y = c \times d^{x} - e \ (L/4 \leq x \leq L/2) \tag{10},$$

$$3.4 \times 10^{-3} < c < 3.5 \times 10^{-3} \tag{11), and}$$

$$1.3 \times 10^{9} < d < 2.0 \times 10^{9} \tag{12); and}$$

the curved lines defining the shape of the lens plane of each lens element of emergence, given by the above numerical formulae (1) to (4) and (9) to (12), are on the x-y coordinates, and in these numerical formulae, $\underline{x}$ denotes the coordinate axis passing through both ends of the lens element of emergence, extending in the direction of the width of this lens element, $\underline{y}$ denotes the coordinate axis crossing the protruding apex of the lens element of emergence, the positive direction of the y-coordinate axis being from the viewer's side toward the image source side, L is the distance between the two ends of the lens element of emergence, $\underline{a}$, $\underline{b}$, $\underline{c}$ and $\underline{d}$ are the coefficients, and $\underline{e}$ is the intercept between the curved line and the y-coordinate axis and is the coefficient relating to the height of the lens element of emergence.

According to the second aspect for fulfilling the object of the present invention, in each lens element of emergence through which the light collected by each lens element of incidence passes, the shape of the lens plane of the center portion of the lens, the width of this portion being a half of the total lens width, is different from the shape of the lens plane of each side portion of the lens, the width of this portion being a quarter of the total lens width, and the shapes of the lens planes of these portions are defined by curved lines fulfilling the conditions expressed by the above numerical formulae (1) to (4) and (9) to (12), so that the lens plane of each lens element of emergence can totally reflect not more than approximately 5% of the red light (R) and blue light (B) obliquely incident on the lens plane. For this reason, it is possible to decrease both the amount of outgoing blue light (B), which has so far appeared to be too large when the projected image is viewed from an angle between 20° and 40°, and the amount of the outgoing red light (R), which has so far appeared to be too large when the projected image is viewed from an angle between −20° and −40°. As a result, the balance between those parts in which the amount of light is too large and those parts in which the amount of light is small is improved, and the color shift can thus be reduced. Moreover, it is possible to eliminate the reversion of color of the projected light (red light (R) and blue light (B)) that occurs when the projected image is viewed from an angle of ±40° or more.

In the aforementioned first and second aspects for fulfilling the object of the present invention, it is preferable that the lens plane of each lens element of incidence be in the shape defined by a curved line fulfilling the conditions that are the same over the entire lens width.

Specifically, the lens plane of each lens element of incidence is preferably in the shape defined by a curved line given by the following numerical formulae (13) to (16):

$$y' = m x'^{4} + n x'^{2} + o \ (-L'/2 \leq x \leq L'/2) \tag{13},$$

$$-5.5 \leq m \leq -10.7 \tag{14},$$

$$-2.0 \leq n \leq -2.5 \tag{15), and}$$

$$0.160 \leq o \leq 0.200 \tag{16), and}$$

the curved line defining the shape of the lens plane of each lens element of incidence, given by the above numerical formulae (13) to (16), is on the x'-y' coordinates, and in these numerical formulae, $\underline{x}'$ denotes the coordinate axis passing through both ends of the lens element of incidence, extending in the direction of the width of this lens element, $\underline{y}'$ denotes the coordinate axis crossing the protruding apex of the lens element of incidence, the positive direction of the y'-coordinate axis being from the viewer's side toward the image source side, L' is the distance between the two ends of the lens element of incidence, $\underline{m}$ and $\underline{n}$ are the coefficients, and $\underline{o}$ is the intercept between the curved line and the y'-coordinate axis and is the coefficient relating to the height of the lens element of incidence.

Further, in the above-described first and second aspects for fulfilling the object of the invention, the image source comprises three-tube-type projection tubes for red, green and blue colors. Furthermore, it is preferable that the lenticular lens sheet shows a gain of not more than 5.0 dB at a viewing angle between −45° and +45° in a color shift curve drawn by plotting vertically the proportions of the gains for red light $G_R$ to the gains for blue light $G_B$ ($20 \times \log_{10}(G_R/G_B)$), these gains being obtained from the gain chart that shows the properties of letting light emerge in the lenticular lens sheet.

DETAILED DESCRIPTION OF PREFERRED EMBODIMENTS

Embodiments of the present invention will be described hereinafter with reference to the accompanying drawings.

First of all, the entire construction of a rear projection display into which a rear projection screen comprising a lenticular lens sheet according to an embodiment of the present invention is incorporated will be described with reference to FIG. 1.

Figure 1:
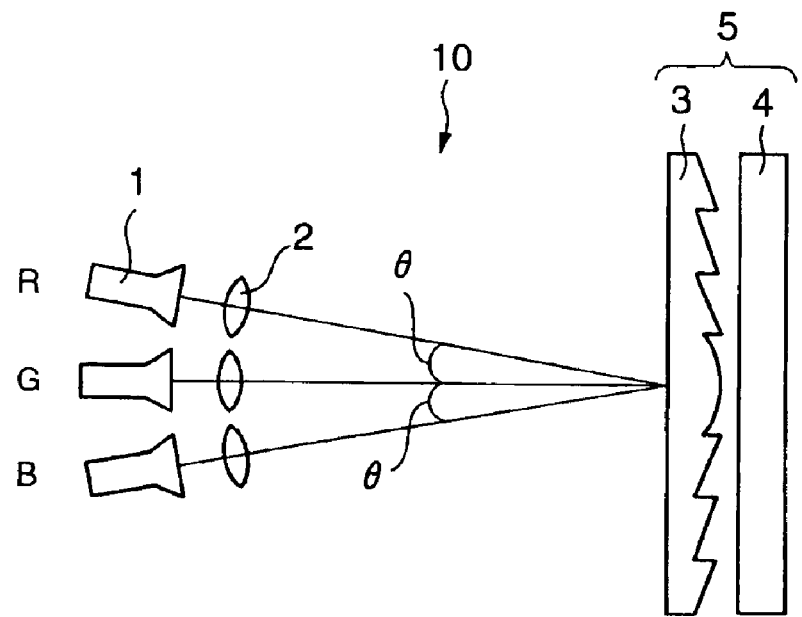
FIG. 1 is a view showing an example of the general construction of a rear projection display into which a rear projection screen comprising a lenticular lens sheet according to an embodiment of the present invention is incorporated.

As shown in FIG. 1, a rear projection display 10 comprises: three CRT's 1 for R, G and B that serve as an image source; a plurality of projection lenses 2 that magnify the imaging light emitted from the respective CRT's 1; and a rear projection screen 5 on which the imaging light magnified by the projection lenses 2 are projected. The rear projection screen 5 comprises a Fresnel lens sheet 3 and a lenticular lens sheet 4, and allows the imaging light emitted from the CRT's 1, incident on the rear of the screen, to emerge toward the viewer's side at the desired angle of view. The Fresnel lens sheet 3 is a lens member for deflecting the imaging light incident on the rear and letting the deflected light emerge toward the viewer's side. The lenticular lens sheet 4 is a lens member for diffusing, in both the horizontal and vertical directions at predetermined angles, the imaging light emerged from the Fresnel lens sheet 3, thereby spreading the imaging light to the desired angle of view.

For such a rear projection screen 5, the CRT's 1 for R, G and B are arranged so that the CRT 1 for green color (G) is positioned directly in front of the screen and that the CRT 1 for red color (R) and the CRT 1 for blue color (B) are positioned on either side of the CRT 1 for G, so that, of the imaging light incident on the front surface of the screen, red light (R) and blue light (B) are, relative to green light (G), incident on the screen at an angle of convergence θ with the normal to the screen.

Next, the lenticular lens sheet 4 for use in the rear projection screen 5 shown in FIG. 1 will be explained with reference to FIG. 2.

Figure 2:
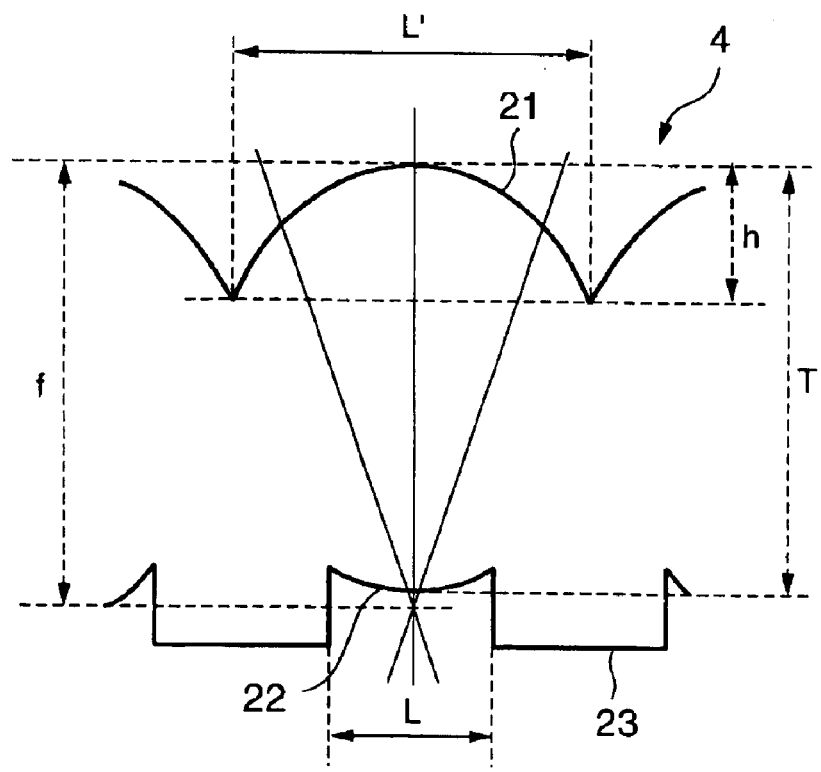
FIG. 2 is a view for explaining the shapes of lens elements of incidence and of emergence on a lenticular lens sheet according to an embodiment of the present invention.

As shown in FIG. 2, the lenticular lens sheet 4 comprises: a plurality of lens elements of incidence 21 arranged on the incidence side; and a plurality of lens elements of emergence 22 arranged on the emergence side. The light that has passed through each lens element of incidence 21 are allowed to converge via the protruding apex of the corresponding lens element of emergence 22. Further, on the lens elements of emergence 22 side of the lenticular lens sheet 4, light-absorbing layers 23 are formed alternately with the lens elements of emergence 22. In FIG. 2, reference character $\underline{h}$ denotes the height (thickness) of the lens element of incidence 21, reference character $\underline{f}$, the focal length of the lens element of incidence 21, reference character T, the effective thickness of the lenticular lens sheet 4, and reference character L, the distance between the two ends of the lens element of emergence 22.

The lens plane of each lens element of emergence 22 is in a specific shape. The shape of the lens plane of each lens element of emergence 22 will be hereinafter described in detail with reference to FIG. 3A.

Figure 3A:
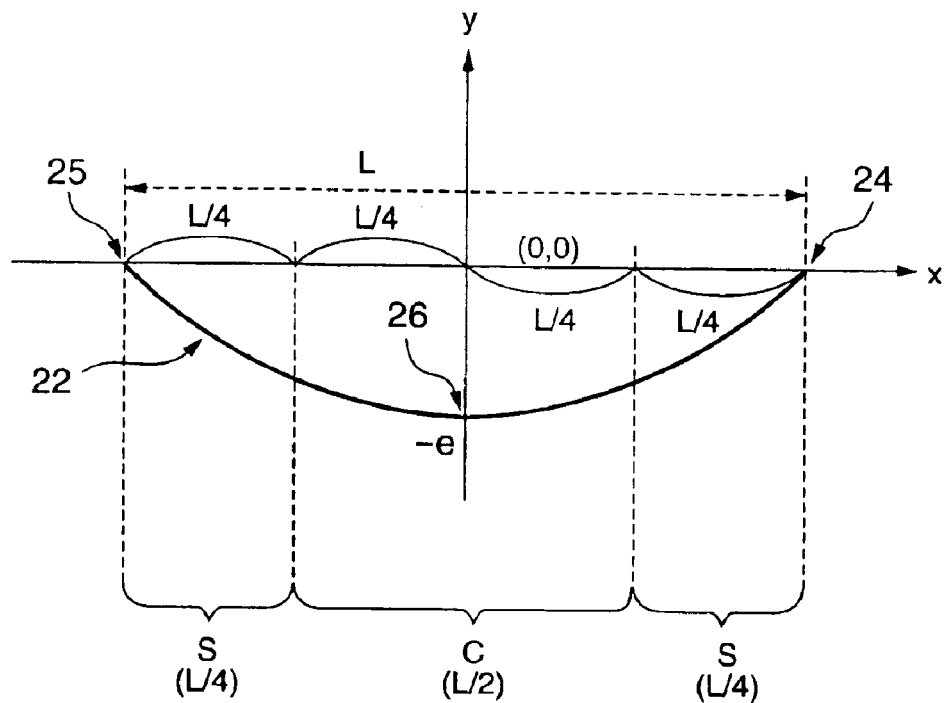
FIG. 3A is a view for explaining the details of the shape of the lens plane of each lens element of emergence on the lenticular lens sheet shown in FIG. 2.

As shown in FIG. 3A, the lens plane of each lens element of emergence 22 is in the shape defined by a curved line on predetermined coordinates. In FIG. 3A, reference character $\underline{x}$ denotes the coordinate axis passing through both ends 24 and 25 of the lens element of emergence 22, extending in the direction of the width of this lens element. Reference character $\underline{y}$ denotes the coordinate axis crossing the protruding apex 26 of the lens element of emergence 22, the positive direction of this axis being from the viewer's side toward the image source (CRT's 1) side. Further, in FIG. 3A, (0,0) is the origin (intersection) of the x- and y-coordinate axes, and reference character L is the distance between the two ends 24 and 25 of the lens element of emergence 22. Reference character C denotes the center portion of the lens element of emergence 22, the width of this portion C being a half of the total lens width L (i.e., L/2). Reference character S denotes each side portion of the lens element of emergence 22, the width of this portion S being a quarter of the total lens width L (i.e., L/4). Namely, this portion S extends from the end 24 or 25 toward the protruding apex 26, but is limited to have a width equal to a quarter of the total lens width L (i.e., L/4).

In the lenticular lens sheet 4 according to this embodiment, each lens element of emergence 22 described above is characterized in that the lens plane of the center portion C of the lens and that of each side portion S of the lens are in specific shapes.

(First Embodiment of Lens Elements of Emergence)

Specifically, the lens plane of each lens element of emergence 22 on the lenticular lens sheet 4 is, as the first embodiment, preferably in the following shape.

Namely, in the first embodiment, the lens plane of the center portion C of each lens element of emergence 22, the width of this portion C being a half of the total lens width L (i.e., L/2), is preferably in the shape defined by a curved line on the x-y coordinates shown in FIG. 3A, fulfilling the conditions expressed by the following numerical formulae (1) to (4):

$$y = a \times b^{-x} - e \quad (-L/4 \leq x \leq 0) \tag{1},$$

$$y = a \times b^{x} - e \quad (0 \leq x \leq L/4) \tag{2},$$

$$3.0 \times 10^{-4} < a < 3.8 \times 10^{-4} \tag{3, and}$$

$$1.0 \times 10^{24} < b < 1.0 \times 10^{25} \tag{4}.$$

Further, the lens plane of each side portion S of each lens element of emergence 22, the width of this portion S being a quarter of the total lens width L (i.e., L/4), is preferably in the shape defined by a curved line fulfilling the conditions expressed by the following numerical formulae (5) to (8):

$$y = c \times d^{-x} - e \, (-L/2 \leq x \leq -L/4) \quad (5),$$

$$y = c \times d^{x} - e \, (L/4 \leq x \leq L/2) \quad (6),$$

$$3.0 \times 10^{-3} < c < 3.1 \times 10^{-3} \quad (7), \text{ and}$$

$$2.7 \times 10^{9} < d < 4.0 \times 10^{9} \quad (8).$$

In the above numerical formulae (1) to (8), a, b, c and d are the coefficients for specifying the shapes of the lens planes of the respective portions, and, in this first embodiment, by making these coefficients fall in the above-described respective ranges, it is possible to obtain the aforementioned effects. If the coefficients a, b, c and d are not in the above ranges, the expected effects may not be obtained. Further, in the above numerical formulae (1), (2), (5) and (6), e denotes the intercept between the curved line that defines the shape of the lens plane and the y-coordinate axis (see FIG. 3A) and is the coefficient relating to the height of the lens element of emergence 22. The width L of the lens element of emergence 22 is preferably from 0.15 to 0.46 mm.

Thus, according to this first embodiment of the lenticular lens sheet 4, in each lens element of emergence 22 through which projected light that has been collected by each lens element of incidence 21 passes, the shape of the lens plane of the center portion C of the lens, the width of this portion C being a half of the total lens width L (i.e., L/2), is different from the shape of the lens plane of each side portion S of the lens, the width of this portion S being a quarter of the total lens width L (i.e., L/4), and the shapes of the lens planes of these portions are defined by curved lines fulfilling the conditions expressed by the above numerical formulae (1) to (8), so that it is possible to effectively scatter the amount of the light (red light (R) and blue light (B)) that emerge from the lens elements of emergence 22 after obliquely entering the lens planes of these lens elements. For this reason, it is possible to decrease both the amount of outgoing blue light (B), which has so far appeared to be too large when the projected image is viewed from an angle between 20° and 40°, and the amount of outgoing red light (R), which has so far appeared to be too large when the projected image is viewed from an angle between −20° and −40°. As a result, the balance between those parts in which the amount of light is too large and those parts in which the amount of light is small is improved, and the color shift can thus be reduced. In the case where the lens plane of each lens element of emergence 22 is not in the shape defined by curved lines fulfilling the conditions expressed by the above numerical formulae (1) to (8), the above-described effects cannot be obtained, and the color shift problem occurs as in the prior art.

(Second Embodiment of Lens Elements of Emergence)

Although, in the aforementioned first embodiment, the lens plane of each lens element of emergence 22 on the lenticular lens sheet 4 is in the shape defined by curved lines fulfilling the conditions expressed by the above numerical formulae (1) to (8), this lens plane may also be in the shape described below, as the second embodiment of the lenticular lens sheet 4. The second embodiment is the same as the above-described first embodiment, except that the shape of the lens plane of each side portion S of each lens element of emergence 22 is different from the shape of the corresponding lens plane in the first embodiment.

Namely, in the second embodiment, the lens plane of the center portion C of each lens element of emergence 22, the width of this portion C being a half of the total lens width L (i.e., L/2), is preferably in the shape defined by a curved line on the x-y coordinates shown in FIG. 3A, fulfilling the conditions expressed by the following numerical formulae (1) to (4):

$$y = a \times b^{-x} - e \, (-L/4 \leq x \leq 0) \quad (1),$$

$$y = a \times b^{x} - e \, (0 \leq x \leq L/4) \quad (2),$$

$$3.0 \times 10^{-4} < a < 3.8 \times 10^{-4} \quad (3), \text{ and}$$

$$1.0 \times 10^{24} < b < 1.0 \times 10^{25} \quad (4).$$

Further, the lens plane of each side portion S of each lens element of emergence 22, the width of this portion S being a quarter of the total lens width L (i.e., L/4), is preferably in the shape defined by a curved line fulfilling the conditions expressed by the following numerical formulae (9) to (12):

$$y = c \times d^{-x} - e \, (-L/2 \leq x \leq -L/4) \quad (9),$$

$$y = c \times d^{x} - e \, (L/4 \leq x \leq L/2) \quad (10),$$

$$3.4 \times 10^{-3} < c < 3.5 \times 10^{-3} \quad (11), \text{ and}$$

$$1.3 \times 10^{9} < d < 2.0 \times 10^{9} \quad (12).$$

In the above numerical formulae (1) to (4) and (9) to (12), a, b, c and d are the coefficients for specifying the shapes of the lens planes of the portions C and S, as in the above-described first embodiment, and, in this second embodiment, by making these coefficients fall in the above-described respective ranges, it is possible to obtain the aforementioned effects. If the coefficients a, b, c and d are not in the above-described ranges, the expected effects may not be obtained. Further, in the above numerical formulae (1), (2), (9) and (10), e is the intercept between the curved line defining the shape of the lens plane and the y-coordinate axis (see FIG. 3A) and is the coefficient relating to the height of the lens element of emergence 22, as in the first embodiment described above.

Thus, according to the second embodiment of the lenticular lens sheet 4, in each lens element of emergence 22 through which projected light that has been collected by each lens element of incidence 21 passes, the shape of the lens plane of the center portion C of the lens, the width of this portion C being a half of the total lens width L (i.e., L/2), is different from the shape of the lens plane of each side portion S of the lens, the width of this portion S being a quarter of the total lens width L (i.e., L/4), and the shapes of the lens planes of these portions are defined by curved lines fulfilling the conditions expressed by the above numerical formulae (1) to (4) and (9) to (12), so that the lens elements of emergence 22 can totally reflect not more than approximately 5% of the red light (R) and blue light (B) obliquely incident on the lens planes of these lens elements. For this reason, it is possible to decrease both the amount of outgoing blue light (B), which has so far appeared to be too large when the projected image is viewed from an angle between 20° and 40°, and the amount of outgoing red light (R), which has so far appeared to be too large when the projected image is viewed from an angle between −20° and −40°. As a result, the balance between those parts in which the amount of light is too large and those parts in which the amount of light is small is improved, and the color shift can thus be reduced. Moreover, it is possible to eliminate the reversion of color of the projected light (red light (R) and blue light (B)) that occurs when the projected image is viewed from an angle of ±40° or more. In the case where the lens plane of each lens element of emergence 22 is not in the shape defined by curved lines fulfilling the conditions expressed by the above numerical formulae (1) to (4) and (9) to (12), the above-described effects cannot be obtained, and the color shift problem occurs as in the prior art.

It is preferable that the lens plane of each lens element of incidence 21 be in the shape defined by a curved line fulfilling the conditions that are the same over the entire width.

Figure 3B:
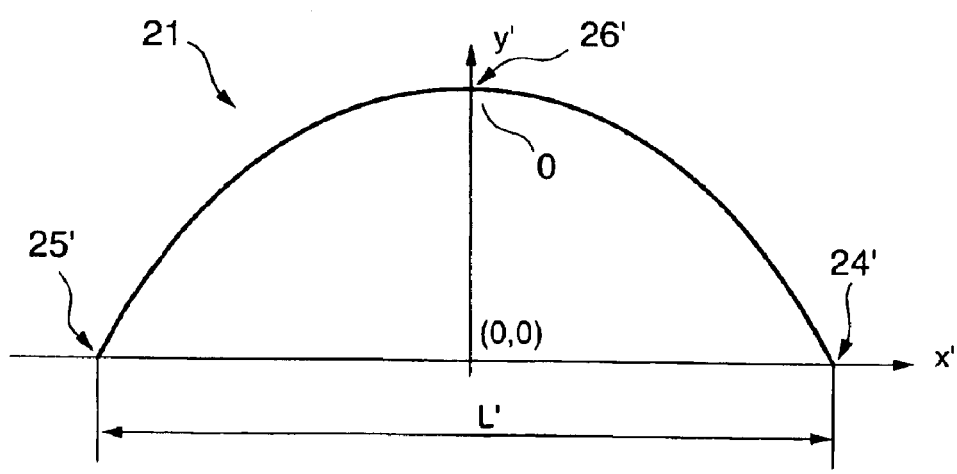
FIG. 3B is a view for explaining the details of the shape of the lens plane of each lens element of incidence on the lenticular lens sheet shown in FIG. 2.

Specifically, as shown in FIG. 3B, the lens plane of each lens element of incidence 21 is preferably in the shape defined by a curved line given by the following numerical formulae (13) to (16):

$$y' = mx'^4 + nx'^2 + o (-L'/2 \leq x \leq L'/2) \quad (13),$$

$$-5.5 \leq m \leq -10.7 \quad (14),$$

$$-2.0 \leq n \leq -2.5 \quad (15), \text{ and}$$

$$0.160 \leq o \leq 0.200 \quad (16).$$

In FIG. 3B, reference character x' denotes the coordinate axis passing through both ends 24' and 25' of the lens element of incidence 21, extending in the direction of the width of this lens element. Reference character y' denotes the coordinate axis crossing the protruding apex 26' of the lens element of incidence 21, the positive direction of this axis being from the viewer's side toward the image source (CRT's 1) side. Further, in FIG. 3B, (0,0) is the origin (intersection) of the x'- and y'-coordinate axes, and reference character L' is the distance between the two ends 24' and 25' of the lens element of incidence 21. m and n are the coefficients, and o is the intercept between the curved line and the y'-coordinate axis and is the coefficient relating to the height of the lens element of incidence 21. The width L' of the lens element of incidence 21 is preferably from 0.35 to 0.72 mm.

(Properties of Letting Light Emerge in Lenticular Lens Sheet)

Figure 4A:
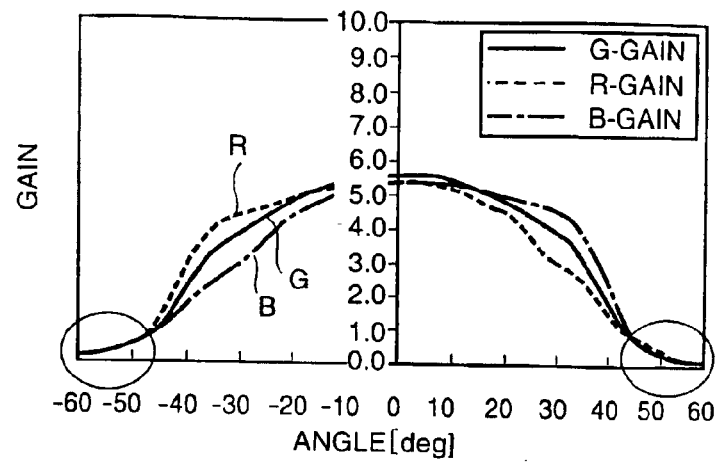
FIGS. 4A, 4B and 4C are graphs showing the properties of letting light emerge in the lenticular lens sheets of Examples 1 and 2 and Comparative Example 1, respectively.
Figure 4B:
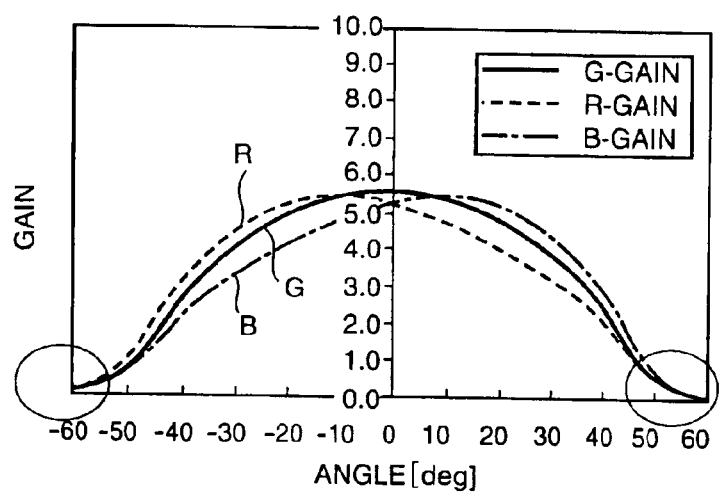
Figure 4C:
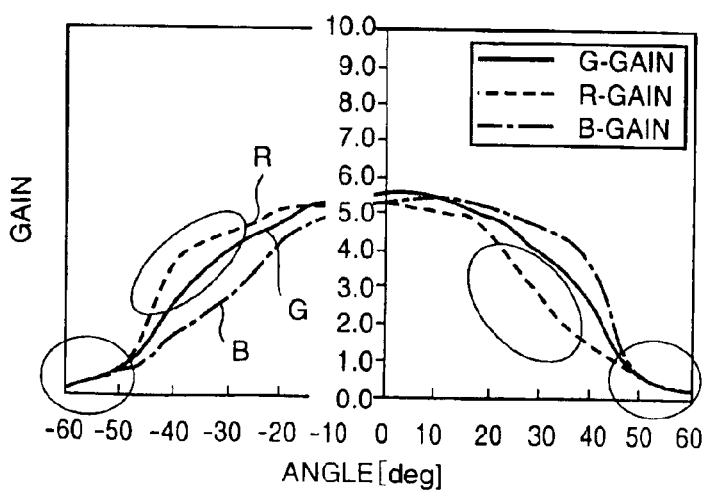

The properties of letting light emerge in the lenticular lens sheet 4 can be evaluated from such gain charts as are shown in FIGS. 4A, 4B and 4C. The gain chart herein is a diagram showing the relationship between the viewing angle with a screen (axis of abscissa) and the gain (axis of ordinate). The gain is obtained in the following manner: red, green and blue light rays are projected on a screen from the rear, and the luminance distribution, according to viewing angle, of the light of each color emerging from the screen is firstly obtained; the gain is then obtained, using the illuminance on the screen and the luminance of the emergent light of each color, from the relational expression "gain G=π×luminance (cd/m²)/illuminance (lx)". The color-shift-reducing effect, which is an objective of the present invention, can be evaluated from this gain chart; that is, when the curves for red, green and blue light are closer to one another, the color shift is more reduced. The details of FIGS. 4A, 4B and 4C are given in Examples that will be described later.

Figure 5A:
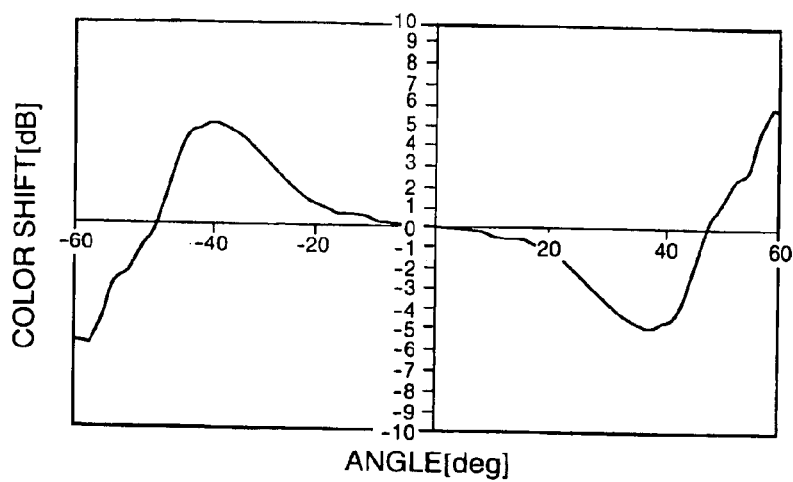
FIGS. 5A, 5B and 5C are graphs showing the tendencies of the lenticular lens sheets of Examples 1 and 2 and Comparative Example 1 to cause the color shift, respectively.
Figure 5B:
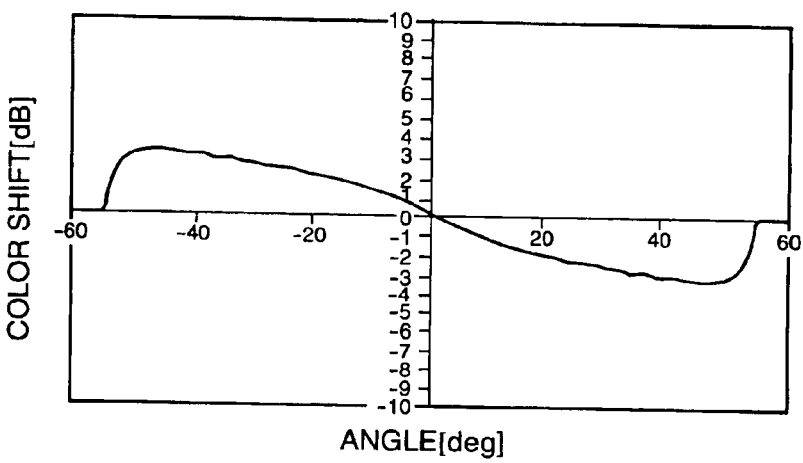
Figure 5C:
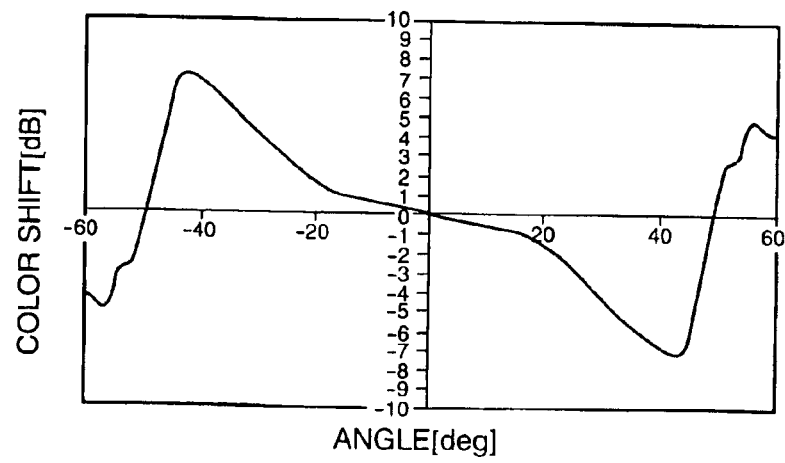

Further, the tendency of the lenticular lens sheet 4 to cause the color shift can be evaluated from such color shift curves as are shown in FIGS. 5A, 5B and 5C. The color shift curve is a graph obtained by vertically plotting $20 \times \log_{10} (G_R/G_B)$ against the viewing angle with a screen (axis of abscissa). $G_R$ is the gain for red light (R), $G_B$ is the gain for blue light (B), and $G_R/G_B$ is the proportion of the gain for red light (R) to the gain for blue light (B) at a certain viewing angle. In the color shift curves shown in FIGS. 5A, 5B and 5C, that the gain does not exceed 5.0 dB at a viewing angle between −45° and +45° means that the color-shift-reducing effect is satisfactorily obtained. The details of FIGS. 5A, 5B and 5C are given in Examples that will be described later.

(Rear Projection Screen)

The lenticular lens sheet 4 according to the above-described embodiment is, as shown in FIG. 1, used in combination with a Fresnel lens sheet 3 and a variety of sheets such as a front sheet for protecting the reflection of extraneous light (not shown in the figure) to constitute a rear projection screen 5. The structure, type, etc. of the Fresnel lens sheet 3 and of the front sheet (not shown in the figure) are not particularly limited, and any of the conventional ones can be used. As a result, it becomes possible to provide a rear projection screen having a decreased tendency to cause the color shift, and this screen can thus be conveniently used as an up-to-date, thinner rear projection screen for which three CRT's for R, G are B are used as an image source.

EXAMPLES

Specific examples of the aforementioned embodiments will be given hereinafter.

Example 1

A lenticular lens sheet having the following features was prepared as a lenticular lens sheet of Example 1. Namely, the lens plane of the center portion of each lens element of emergence was made into the shape defined by the curved line given by the numerical formulae $y = a \times b^{-x} - 0.049 (-L/4 \leq x \leq 0)$ and $y = a \times b^{x} - 0.049 (0 \leq x \leq L/4)$, and coefficients a and b were made $3.2 \times 10^{-4}$ and $5.0 \times 10^{24}$, respectively. Moreover, the lens plane of each side portion of each lens element of emergence was made into the shape defined by the curved line given by the numerical formulae $y = c \times d^{-x} - 0.049 (-L/2 \leq x \leq -L/4)$ and $y = c \times d^{x} - 0.049 (L/4 \leq x \leq L/2)$, and coefficients c and d were made $3.05 \times 10^{-3}$ and $3.0 \times 10^{9}$, respectively. All of the lens elements of emergence were formed to have the same width (L=0.26 mm). In addition to the lens elements of emergence, light-absorbing layers were provided on those parts on the emergence side of the lenticular lens sheet on which light emerging from lens elements of incidence did not converge.

On the other hand, on the incidence side of the lenticular lens sheet, lens elements of incidence that were cylindrical lenses extending vertically were arranged horizontally with a fixed pitch. All of the lens elements of incidence were formed to have the same width (0.52 mm), and the lens plane of each lens element was made into the shape approximated by the numerical formula $y = -6.9x^4 - 2.4x^2 + 0.2$. In general, preferable lens elements of incidence are those ones having a height h between 160 μm and 200 μm, capable of diffusing light in the horizontal direction at an angle (αH) of 34° or more when combined with lens elements of emergence. In the lenticular lens sheet of Example 1, the lens elements of incidence were formed to have a height h of 190 μm, and the angle of horizontal diffusion (αH) was adjusted to 37°.

Further, the effective thickness T of the sheet (the distance between the apex of the lens element of incidence and that of the lens element of emergence) was made 0.65 mm. This effective thickness T was 0.93 times the focal length f of each lens element of incidence for green light (G).

Example 2

A lenticular lens sheet having the following features was prepared as a lenticular lens sheet of Example 2. Namely, the lens plane of the center portion of each lens element of emergence was made into the shape defined by the curved line given by the numerical formulae $y=a \times b^{-x}-0.049(-L/4 \leq x \leq 0)$ and $y=a \times b^{x}-0.049(0 \leq x \leq L/4)$, and coefficients $\underline{a}$ and $\underline{b}$ were made $3.0 \times 10^{-4}$ and $5.0 \times 10^{24}$, respectively. Further, the lens plane of each side portion of each lens element of emergence was made into the shape defined by the curved line given by the numerical formulae $y=c \times d^{-x}-0.049(-L/2 \leq x \leq -L/4)$ and $y=c \times d^{x}-0.049(L/4 \leq x \leq L/2)$, and coefficients $\underline{c}$ and $\underline{d}$ were made $3.45 \times 10^{-3}$ and $1.5 \times 10^{9}$, respectively. All of the lens elements of emergence were formed to have the same width (L=0.26 mm). In addition to the lens elements of emergence, light-absorbing layers were provided on those parts on the emergence side of the lenticular lens sheet on which light emerging from lens elements of incidence did not converge.

On the other hand, on the incidence side of the lenticular lens sheet, lens elements of incidence that were cylindrical lenses extending vertically were arranged horizontally with a fixed pitch, as in Example 1. All of the lens elements of incidence were formed to have the same width (0.52 mm), and the lens plane of each lens element was made into the shape approximated by the numerical formula $y=-6.9x^{4}-2.3x^{2}+0.2$. The other conditions of these lens elements of incidence were basically the same as those in Example 1; that is, the lens elements of incidence were formed to have a height $\underline{h}$ of 190 μm, and the angle of horizontal diffusion (αH) was adjusted to 37°.

Further, the effective thickness T of the sheet (the distance between the apex of the lens element of incidence and that of the lens element of emergence) was made 0.65 mm. This effective thickness T was 0.93 times the focal length $\underline{f}$ of each lens element of incidence for green light (G).

Comparative Example 1

A lenticular lens sheet having the following features was prepared as a lenticular lens sheet of Comparative Example 1. Namely, the lens plane of the center portion of each lens element of emergence was made into the shape defined by the curved line given by the numerical formulae $y=a \times b^{-x}-0.049(-L/4 \leq x \leq 0)$ and $y=a \times b^{x}-0.049(0 \leq x \leq L/4)$, and coefficients $\underline{a}$ and $\underline{b}$ were made $1.1 \times 10^{-3}$ and $2.0 \times 10^{13}$, respectively. Further, the lens plane of each side portion of each lens element of emergence was made into the shape defined by the curved line given by the numerical formulae $y=c \times d^{-x}-0.049(-L/2 \leq x \leq -L/4)$ and $y=c \times d^{x}-0.049(L/4 \leq x \leq L/2)$, and coefficients $\underline{c}$ and $\underline{d}$ were made $5.0 \times 10^{-3}$ and $6.0 \times 10^{9}$, respectively. All of the lens elements of emergence were formed to have the same width (L=0.26 mm). In addition to the lens elements of emergence, light-absorbing layers were provided on those parts on the emergence side of the lenticular lens sheet on which light emerging from lens elements of incidence did not converge.

On the other hand, on the incidence side of the lenticular lens sheet, lens elements of incidence that were cylindrical lenses extending vertically were arranged horizontally with a fixed pitch, as in Examples 1 and 2. All of the lens elements of incidence were formed to have the same width (0.52 mm), and the lens plane of each lens element was made into the shape approximated by the numerical formula $y=-6.9x^{4}-2.3x^{2}+0.2$. The other conditions of these lens elements of incidence were basically the same as those in Examples 1 and 2; that is, the lens elements of incidence were formed to have a height $\underline{h}$ of 190 μm, and the angle of horizontal diffusion (αH) was adjusted to 37°.

Further, the effective thickness T of the sheet (the distance between the apex of the lens element of incidence and that of the lens element of emergence) was made 0.65 mm. This effective thickness T was 0.93 times the focal length $\underline{f}$ of each lens element of incidence for green light (G).

(Results of Evaluation)

Imaging light emitted from three CRT's for R, G and B were projected on each one of the lenticular lens sheets of Examples 1 and 2 and Comparative Example 1, and the characteristics of these lenticular lens sheets were evaluated. The CRT's for R, G and B were arranged so that the CRT for green color (G) was positioned directly in front of the screen and that the CRT for red color (R) and the CRT for blue color (B) were positioned on either side of the CRT for G, whereby red light (R) and blue light (B) were allowed to enter, relative to green light (G), the screen at an angle of convergence θ of 11.3° with the normal to the screen.

The gain chart (graph showing the amount of emergent light) and the color shift curve for the lenticular lens sheet of Example 1 are shown in FIG. 4A and FIG. 5A, respectively. As is clear from FIG. 4A and FIG. 5A, the lenticular lens sheet of Example 1 is excellent in the balance between those parts in which the amount of light is large and those parts in which the amount of light is small, as compared with the lenticular lens sheet of Comparative Example 1, and color-shift reduction was confirmed when the projected image was viewed from an angle between 20° and 40° and between −20° and −40°.

The gain chart (graph showing the amount of emergent light) and the color shift curve for the lenticular lens sheet of Example 2 are shown in FIG. 4B and FIG. 5B, respectively. As is clear from FIG. 4B and FIG. 5B, the lenticular lens sheet of Example 2 is excellent in the balance between those parts in which the amount of light is large and those parts in which the amount of light is small, as compared with the lenticular lens sheet of Comparative Example 1, and color-shift reduction was confirmed when the projected image was viewed from an angle between 20° and 40° and between −20° and −40°. Moreover, as FIG. 4B clearly shows, no reversion of color of the projected light (red light (R) and blue light (B)) was found even when the projected image was viewed from an angle of ±40° or more.

The gain chart (graph showing the amount of emergent light) and the color shift curve for the lenticular lens sheet of Comparative Example 1 are shown in FIG. 4C and FIG. 5C, respectively. As is clear from FIG. 4C, the amount of outgoing red light (R) was found too large when the projected image was viewed from an angle between −20° and −40° and was too small, between +20° and +40°, while the amount of outgoing blue light (B) was found too small when the projected image was viewed from an angle between −20° and −40° and was too large, between +20° and +40°

What is claimed is:

1. A lenticular lens sheet for use in a rear projection screen that allows imaging light emitted from an image source, the imaging light being incident on a rear of the screen, to emerge toward a viewer's side, comprising:
   a plurality of lens elements of incidence arranged on an incidence side; and
   a plurality of lens elements of emergence arranged on an emergence side,
   wherein a light that has passed through each of the lens elements of incidence converges via a protruding apex of a corresponding lens element of emergence;
   a lens plane of a center portion of each of the lens elements of emergence, a width of the center portion being a half of a total lens width, is in a shape defined by a curved line fulfilling the conditions expressed by the following numerical formulae (1) to (4):

$$y = a \times b^{-x} - e \; (-L/4 \leq x \leq 0) \tag{1},$$

$$y = a \times b^{x} - e \; (0 \leq x \leq L/4) \tag{2},$$

$$3.0 \times 10^{-4} < a < 3.8 \times 10^{-4} \tag{3, and}$$

$$1.0 \times 10^{24} < b < 1.0 \times 10^{25} \tag{4};$$

a lens plane of each side portion of each of the lens elements of emergence, a width of the each side portion being a quarter of the total lens width, is in a shape defined by a curved line fulfilling the conditions expressed by the following numerical formulae (5) to (8):

$$y = c \times d^{-x} - e \; (-L/2 \leq x \leq -L/4) \tag{5},$$

$$y = c \times d^{x} - e \; (L/4 \leq x \leq L/2) \tag{6},$$

$$3.0 \times 10^{-3} < c < 3.1 \times 10^{-3} \tag{7, and}$$

$$2.7 \times 10^{9} < d < 4.0 \times 10^{9} \tag{8; and}$$

the curved lines defining the shape of the lens plane of each of the lens elements of emergence, given by the above numerical formulae (1) to (8), are on the x-y coordinates, and in these numerical formulae, $\underline{x}$ denotes the coordinate axis passing through both ends of the lens element of emergence, extending in a direction of the width of this lens element, $\underline{y}$ denotes the coordinate axis crossing the protruding apex of the lens element of emergence, the positive direction of the y-coordinate axis being from the viewer's side toward the image source side, L is a distance between the two ends of the lens element of emergence, $\underline{a}$, $\underline{b}$, $\underline{c}$ and $\underline{d}$ are coefficients, and $\underline{e}$ is an intercept between the curved line and the y-coordinate axis and is a coefficient relating to a height of the lens element of emergence.

2. The lenticular lens sheet according to claim 1, wherein the lens plane of each of the lens elements of incidence is in a shape defined by a curved line fulfilling the conditions that are the same over an entire lens width.

3. The lenticular lens sheet according to claim 2, wherein the lens plane of each of the lens elements of incidence is in a shape defined by a curved line given by the following numerical formulae (13) to (16):

$$y' = mx'^{4} + nx'^{2} + o \; (-L'/2 \leq x \leq L'/2) \tag{13},$$

$$-5.5 \leq m \leq -10.7 \tag{14},$$

$$-2.0 \leq n \leq -2.5 \tag{15, and}$$

$$0.160 \leq o \leq 0.200 \tag{16; and}$$

the curved line defining the shape of the lens plane of each of the lens elements of incidence, given by the above numerical formulae (13) to (16), is on the x'-y' coordinates, and in these numerical formulae, $\underline{x'}$ denotes the coordinate axis passing through both ends of the lens element of incidence, extending in a direction of a width of this lens element, $\underline{y'}$ denotes the coordinate axis crossing a protruding apex of the lens element of incidence, the positive direction of the y'-coordinate axis being from the viewer's side toward the image source side, L' is a distance between the two ends of the lens element of incidence, $\underline{m}$ and $\underline{n}$ are coefficients, and $\underline{o}$ is an intercept between the curved line and the y'-coordinate axis and is a coefficient relating to a height of the lens element of incidence.

4. The lenticular lens sheet according to claim 1, wherein the image source is three-tube-type projection tubes for red, green and blue colors.

5. The lenticular lens sheet according to claim 1, wherein shown is a gain of not more than 5.0 dB at a viewing angle between −45° and +45° in a color shift curve drawn by plotting vertically proportions of gains for red light $G_R$ to gains for blue light $G_B$ ($20 \times \log_{10} (G_R/G_B)$), these gains being obtained from a gain chart that shows properties of letting light emerge in the lenticular lens sheet.

6. A lenticular lens sheet for use in a rear projection screen that allows imaging light emitted from an image source, the imaging light being incident on a rear of the screen, to emerge toward a viewer's side, comprising:

a plurality of lens elements of incidence arranged on an incidence side; and a plurality of lens elements of emergence arranged on an emergence side, wherein a light that has passed through each of the lens elements of incidence converges via a protruding apex of a corresponding lens element of emergence;

a lens plane of a center portion of each of the lens elements of emergence, a width of the center portion being a half of a total lens width, is in a shape defined by a curved line fulfilling the conditions expressed by the following numerical formulae (1) to (4):

$$y = a \times b^{-x} - e \; (-L/4 \leq x \leq 0) \tag{1},$$

$$y = a \times b^{x} - e \; (0 \leq x \leq L/4) \tag{2},$$

$$3.0 \times 10^{-4} < a < 3.8 \times 10^{-4} \tag{3, and}$$

$$1.0 \times 10^{24} < b < 1.0 \times 10^{25} \tag{4};$$

a lens plane of each side portion of each of the lens elements of emergence, a width of the each side portion being a quarter of the total lens width, is in a shape defined by a curved line fulfilling the conditions expressed by the following numerical formulae (9) to (12):

$$y = c \times d^{-x} - e \; (-L/2 \leq x \leq -L/4) \tag{9},$$

$$y = c \times d^{x} - e \; (L/4 \leq x \leq L/2) \tag{10},$$

$$3.4 \times 10^{-3} < c < 3.5 \times 10^{-3} \tag{11, and}$$

$$1.3 \times 10^{9} < d < 2.0 \times 10^{9} \tag{12; and}$$

the curved lines defining the shape of the lens plane of each of the lens elements of emergence, given by the above numerical formulae (1) to (4) and (9) to (12), are on the x-y coordinates, and in these numerical formulae, $\underline{x}$ denotes the coordinate axis passing through both ends of the lens element of emergence, extending in a direction of the width of this lens element, $\underline{y}$ denotes the coordinate axis crossing the protruding apex of the lens element of emergence, the positive direction of the y-coordinate axis being from the viewer's side toward the image source side, L is a distance between the two ends of the lens element of emergence, $\underline{a}$, $\underline{b}$, $\underline{c}$ and $\underline{d}$ are coefficients, and $\underline{e}$ is an intercept between the curved line and the y-coordinate axis and is a coefficient relating to a height of the lens element of emergence.

7. The lenticular lens sheet according to claim 6, wherein the lens plane of each of the lens elements of incidence is in a shape defined by a curved line fulfilling the conditions that are the same over an entire lens width.

8. The lenticular lens sheet according to claim 7, wherein the lens plane of each of the lens elements of incidence is in a shape defined by a curved line given by the following numerical formulae (13) to (16):

$$y' = mx'^4 + nx'^2 + o \quad (-L'/2 \leq x \leq L'/2) \quad (13),$$

$$-5.5 \leq m \leq -10.7 \quad (14),$$

$$-2.0 \leq n \leq -2.5 \quad (15), \text{ and}$$

$$0.160 \leq o \leq 0.200 \quad (16); \text{ and}$$

the curved line defining the shape of the lens plane of each of the lens elements of incidence, given by the above numerical formulae (13) to (16), is on the x'-y' coordinates, and in these numerical formulae, $\underline{x}'$ denotes the coordinate axis passing through both ends of the lens element of incidence, extending in a direction of a width of this lens element, $\underline{y}'$ denotes the coordinate axis crossing a protruding apex of the lens element of incidence, the positive direction of the y'-coordinate axis being from the viewer's side toward the image source side, L' is a distance between the two ends of the lens element of incidence, $\underline{m}$ and $\underline{n}$ are coefficients, and $\underline{o}$ is an intercept between the curved line and the y'-coordinate axis and is a coefficient relating to a height of the lens element of incidence.

9. The lenticular lens sheet according to claim 6, wherein the image source is three-tube-type projection tubes for red, green and blue colors.

10. The lenticular lens sheet according to claim 6, wherein shown is a gain of not more than 5.0 dB at a viewing angle between −45° and +45° in a color shift curve drawn by plotting vertically proportions of gains for red light $G_R$ to gains for blue light $G_B$ ($20 \times \log_{10} (G_R/G_B)$), these gains being obtained from a gain chart that shows properties of letting light emerge in the lenticular lens sheet.

\* \* \* \* \*